United States Patent
Boman et al.

(10) Patent No.: US 12,458,666 B2
(45) Date of Patent: Nov. 4, 2025

(54) ORAL ADMINISTRATION OF IRON SUCCINATE FOR USE IN TREATING IRON DEFICIENCY IN PATIENTS HAVING HEART FAILURE

(71) Applicant: DOUBLE BOND PHARMACEUTICALS AB, Uppsala (SE)

(72) Inventors: Kurt Boman, Skellefteå (SE); Mona Olofsson, Bureå (SE)

(73) Assignee: Double Bond Pharmaceuticals AB, Uppsala (SE)

( * ) Notice: Subject to any disclaimer, the term of this patent is extended or adjusted under 35 U.S.C. 154(b) by 776 days.

(21) Appl. No.: 17/770,084

(22) PCT Filed: Nov. 18, 2020

(86) PCT No.: PCT/SE2020/051104
§ 371 (c)(1),
(2) Date: Apr. 19, 2022

(87) PCT Pub. No.: WO2021/107835
PCT Pub. Date: Jun. 3, 2021

(65) Prior Publication Data
US 2022/0395530 A1    Dec. 15, 2022

(30) Foreign Application Priority Data
Nov. 26, 2019  (SE) .................................... 1951352-2

(51) Int. Cl.
| | | |
|---|---|---|
| *A61K 33/26* | (2006.01) | |
| *A61K 9/00* | (2006.01) | |
| *A61K 9/16* | (2006.01) | |
| *A61K 9/20* | (2006.01) | |
| *A61P 9/04* | (2006.01) | |
| *A61P 43/00* | (2006.01) | |

(52) U.S. Cl.
CPC ............ *A61K 33/26* (2013.01); *A61K 9/0053* (2013.01); *A61K 9/16* (2013.01); *A61K 9/20* (2013.01); *A61P 9/04* (2018.01); *A61P 43/00* (2018.01)

(58) Field of Classification Search
CPC ........ A61K 33/26; A61K 9/0053; A61K 9/16; A61K 9/20; A61P 43/00; A61P 9/04
See application file for complete search history.

(56) References Cited

U.S. PATENT DOCUMENTS 6,610,325 B1 *  8/2003  Meignant ............... A61K 33/26
424/440

OTHER PUBLICATIONS

Lewis et al., "Oral Iron Therapy for Heart Failure with Reduced Ejection Fraction", Circ Heart Fail. 2016. (Year: 2016).*
Aelst, Lucas N. Van et al., Towards Holistic Heart Failure Management-How to Tackle the Iron Deficiency Epidemic?, Curr Heart Fail Rep., Current Science Inc., vol. 14, No. 4, pp. 223-234 (Jul. 1, 2017).
Brise, Hans et al., Effect of Succinic Acid on Iron Absorption, Acta Medical Scandinavica, vol. 171, Issue 5376, pp. 59-73 (1962).
Cao Guo-Ying et al., Comparative Bioavailability of Ferrous Succinate Tablet Formulations Without Correction for Baseline Circadian Changes in Iron Concentration in Healthy Chinese Male Subjects: A Single-Dose, Randomized, 2-Period Crossover Study, Clinical Therapeutics, vol. 33, No. 12, pp. 2054-2059 (Oct. 31, 2011).
Anonymous, Clinical trial of Inofer: last patient out, Double Bond Pharmaceutical, XP055760681, pp. 1-2 (May 14, 2019).
Iron deficiency and heart failure, XP055770866, URL:https://www.clinicaltrialsregister.eu/ctr-search/trial/2018-000874-31/SE, pp. 1-4 (Mar. 23, 2018).
Von Haeling, Sephan et al., Iron Deficiency in Heart Failure, An Overview, IACC Heart Failure, vol. 7, No. 1, pp. 36-46 (2019).
Lewis, Gregory D. et al., Effect of Oral Iron Repletion on Exercise Capacity in Patients With Heart Failure With Reduced Ejection Fraction and Iron Deficiency : The Ironout HF Randomized Clinical Trial, JAMA The Journal of the American Medical Association, vol. 317, No. 19, pp. 1958-1966 (May 16, 2017).
Marušić, Filip, Parameters of Iron Metabolism in Acutely Decompensated Heart Failure Patients, Diploma thesis University of Split, Split, Croatia, pp. 1-48 (Jul. 2019).
Niehaus, Emily D. et al., Repletion of Iron Stores With the Use of Oral Iron Supplementation in Patients With Systolic Heart Failure, Journal of Cardial Failure, vol. 21, No. 8. pp. 694-697 (Aug. 1, 2015).
Pope, Michael et al., Iron Deficiency in Heart Failure: to Treat or Not to Treat?, Curr Treat Options Cardio Med, vol. 20, No. 8, pp. 1-10 (2018).
Search Report from Priority Application SE 1951352-2 dated Apr. 24, 2020.

* cited by examiner

*Primary Examiner* — Jianfeng Song
(74) *Attorney, Agent, or Firm* — IPorter Wright Morris & Arthur LLP

(57) ABSTRACT

The present invention provides an oral pharmaceutical composition comprising iron succinate for use in treating iron deficiency in a subject diagnosed with heart failure (HF) with reduced ejection fraction (HFrEF), and a method for treatment is also provided.

12 Claims, No Drawings

ORAL ADMINISTRATION OF IRON SUCCINATE FOR USE IN TREATING IRON DEFICIENCY IN PATIENTS HAVING HEART FAILURE

BACKGROUND

Iron deficiency (ID) has been found to be highly present in patients with heart failure (HF), ranging between 32-65% [1].

Iron has a central role of oxygen availability and usage in the myocardium. Besides the crucial role of iron for blood formation it is also important in the energy process of the Krebs cycle.

Recent trials with long-term intravenous therapy with ferric carboxymaltose showed beneficial symptomatic and morbidity effects in patients with HF [2,3].

Absorption from oral iron preparations in patients with HF is generally poor and with associated side effects why compliance may be affected [4]. HF is also regarded as a condition with increased inflammatory response with subsequent elevation of hepcidin levels, which further impair iron absorption [5].

Lewis et. al. tested oral administration of high dose oral iron polysaccharides and found that high-dose oral iron did not improve exercise capacity over 16 weeks and with marginal uptake in iron deposits [6]. Their results did not support use of oral iron supplementation in patients with HF with reduced ejection fraction (HFrEF).

The general recommendation as described In the ESC guidelines for treatment of ID in patients with HF is to use intravenous ferric carboxymaltose and oral treatment is not recommended.

Presence of ID is accompanied by decreased quality of life, functional capacity and increased morbidity irrespective of anaemia or not [2]. Today, iron deficiency in this patient group is treated with intravenous injections which is costly for the society, and less convenient for the patient.

Thus, in view of the above there is a need of providing more effective, convenient and cheaper methods for treating iron deficiency in HF patients.

SUMMARY OF INVENTION

It is an object of the present invention to solve some problems of prior art.

It is a first object to provide a tablet for oral administration comprising Iron succinate for use in the treatment of iron deficiency in an individual, wherein said individual is diagnosed having heart failure with reduced ejection fraction (HFrEF).

The present invention provides an oral pharmaceutical composition comprising iron succinate for use in the treatment of iron deficiency (ID) in an individual, the individual is diagnosed having heart failure (HF) with reduced ejection fraction (HFrEF)

In one aspect the amount iron succinate is in the range of 5 to 1000 mg per dose.

The term dose means the amount or quantity of iron succinate given at a particular time point, the iron succinate may be formulated in the form of a powder, tablet, capsule, solution and granulate.

In another aspect the amount iron succinate is 100 mg per dose.

In yet another aspect the oral pharmaceutical composition for use is in the form of a powder, tablet, capsule, solution and granulate.

It is a second object to provide a more effective and convenient method to treat iron deficiency among HF patients with reduced ejection fraction (HFrEF).

The method for the treatment of iron deficiency in a subject diagnosed with heart failure (HF) with reduced ejection fraction (HFrEF), comprises to orally administrate a pharmaceutically effective dose of a pharmaceutical composition described above comprising iron succinate. The administration is performed at least once a day.

In one aspect is the administration of iron succinate not in conjunction with food.

In another aspect the treatment is performed at least once a day for 3 weeks, 6 weeks, 2 months, 3 months or 6 months.

In another aspect the administration is performed at least once a day for 3 weeks, 6 weeks, 2 months, 3 months or 6 months.

In yet another aspect the treatment is performed twice a day for at least 3 weeks, 6 weeks, 2 months, 3 months or 6 months.

In another aspect the treatment is performed twice a day for at least 3 months

In another aspect the administration is performed twice a day for at least 3 months.

Iron deficiency is one of the most prevalent co-morbid conditions in HF. An estimation of the prevalence revealed that up to 50% of patients with heart failure have low levels of available iron [14]. From a practical point of view and costs, an oral therapy would be most valuable.

DETAILED DESCRIPTION OF INVENTION

It is to be understood that this invention is not limited to the particular configurations, process steps, and materials disclosed herein as such configurations, process steps, and materials may vary somewhat.

It is also to be understood that the terminology employed herein is used for the purpose of describing particular embodiments only and is not intended to be limiting since the scope of the present invention will be limited only by the appended claims and equivalents thereof.

All references cited are incorporated herein by reference in their entirely and for all purposes to the same extent as if each individual publication or patent or patent application was specifically and individually indicated to be incorporated by reference in its entirety for all purposes.

The present invention is best understood by reference to the following definitions, the Figures and exemplary disclosure provided herein.

In this specification, unless otherwise stated, the term "pharmaceutically acceptable excipient" means a non-toxic, inert solid, semi-solid or liquid filler, diluent, encapsulating material or formulation auxiliary of any type.

In this specification, unless otherwise stated, the term "pharmaceutically active compound" encompasses any substance that will produce a therapeutically beneficial pharmacological response when administered to a host, including both humans and animals.

In this specification the term "administering" or "administration" means providing a drug to a subject in a manner that is pharmacologically useful.

The uptake of iron from the intestine depends on a number of different factors, for example whether the iron is bivalent or trivalent. It is also essential what type of dissociation iron complex that is used for the iron uptake, shown in several studies by Brise and Hallberg [7]. They found that iron succinate seemed to have the most favourable uptake compared to other iron compounds, maybe through an effect of succinate on intracellular transport mechanisms, irrespective if iron was given orally or intravenously.

Thus, the inventors decided to study if an oral pharmaceutical composition comprising iron succinate could, perhaps, be useful for treating ID in patients diagnosed with heart failure.

EXPERIMENTS

Patients and Methods

Patients hospitalized or treated as outpatients and registered at department of Medicine-Geriatric, Skelleftea during the year 2017 with a main or secondary diagnosis of heart failure were 140 and 164 patients, respectively. Most of these patients were screened during the year 2018 until January 2019 were the target population. Of approximately 300 potential patients, 42 patients were screened and found eligible. These 42 patients defined by inclusion and exclusion criteria for participation were called by phone and informed about the study. After having given oral and written consent to participate blood sampling was performed to confirm or reject the presence of non-anemic ID. Twenty-one patients did not have iron deficiency and one did not want to participate in the study. Twenty patients fulfilled the criteria for the study.

Inclusion Criteria

All patients with a case record diagnosis of HF, both those with preserved EF or reduced EF were potentially eligible, provided there were no contraindications to participate.

The diagnosis of HF was on symptoms and an ECHO verified reduction of cardiac function, systolic and/or diastolic dysfunction. Those with an EF=<40% were classified as HFrEF and those with EF>40% as preserved HF. When EF was described as normal or mildly reduced, these patients were classified as having HFpEF. Those with moderately or severely reduced EF were classified as HFrEF, Ferritin <100 µg/L or 100 -299 µg/L together with transferrin saturation (TSAT) less 20%.

Exclusion Criteria

If the case records revealed patients with a primary diagnosis of cancer, dementia or other terminal disease or if the patient were planned for intravenous iron treatment, they were not offered participation Participation in other study Denial of participation Anaemia defined as haemoglobin <120 g/L for females and <130 g/l for males Method and Dosage:

The study was planned as an open pilot study without placebo control. The study was performed at the research unit at the department of Medicine-Geriatric, a special heart failure case record with laboratory data was filed before the start of the study, after six weeks and after 3 months (±2 weeks) at the end of study. Adverse reactions and side effects were registered at each visit. Criteria for stopping the treatment was if the patient exhibited severe side effects or adverse reactions or if the patient wished to stop the trial.

Treatment and Iron Dose

Inofer® is an oral product against ID in a form of film-coated tablets. The active substance is ferrous succinate (iron succinate), 100 mg corresponding to 32.48 mg $Fe^{2+}$ (divalent iron) per tablet. The patients are given one tablet ( )twice a day during a period of at least three months.

One tablet of 100 mg of ferrous succinate (comprising 32.48 mg $Fe^{2+}$ and 100 mg succinate) was administered to the patients twice a day. 1 tablet was taken in the morning and 1 tablet was taken in the evening at bedtime for at least 3 months. The tablet was not taken with food.

The patients were also instructed not to change their dietary habits.

Compliance was checked at 6 weeks and 3 months.

Laboratory Test

Blood sampling was performed according to local and current guidelines. Blood was centrifuged, divided into aliquots and stored at minus 80° C. in a safe deposit box, Biobank Västerbotten, until analysis. Hemoglobin, CRP, ferritin, serum iron, TSAT and hepcidin were analyzed before start, at 6 weeks and 3 months after treatment.

Statistics

Power calculation. The baseline for the patients was decided to a ferritin mean value of approximately 50 µg/L. The inventors hypothesized that a clinically meaningful increase should be at least 25 µg/L, i.e., a relative increase of 50%. A non-parametric related test with a 95% power and a p-value <0.05 required at least 16 patients.

The inventors assumed that 4 patients may have to stop medication and leave the study, thus planning 20 patients for the study. All analyses were made according to the intention to treat analysis.

Continuous variables are presented as means ±standard deviation for normally distributed values, median and interquartile range for skewed variables, and numbers and percentages for categorical variables. Due to skewed variables for ferritin and TSAT non-parametric test was used for related or independent data. Data were analysed using IBM SPSS Software version 24 (IBM Corp. Chicago, Illinois, USA).

Ethics.

All patients gave written informed consent, and the ethical committee of Umeå university approved the study DNR 2018-119-31M.

Approval was also given from Swedish Medical Product Agency, No. 6.3.1.-2018-040698.

Results

A total of 20 patients were included in the study. The mean age was 72.7±8.6 years.

The baseline characteristics are as shown in Table 1 below.

TABLE 1

| Baseline characteristics | Number of patients (n) | % |
|---|---|---|
| Number of patients | 20 | 100 |
| Male | 15 | 75 |
| Women | 5 | 25 |
| HFpEF > 40% | 9 | 45 |
| HFrEF ≤ 40% | 11 | 45 |
| Iron deficiency | 17 | 85 |
| Functional iron deficiency | 3 | 15 |
| History of hypertension | 12 | 60 |
| History of atrial fibrillation | 9 | 45 |
| History of type II diabetes | 9 | 45 |
| History of valvular disorder | 1 | 5 |
| NYHA Class* | | |
| 1 | 1 | 5 |
| 2 | 9 | 50 |
| 3 | 8 | 42 |
| 4 | 1 | 5 |

*New Heart Association Class

Symptoms commonly related to iron treatment are summarized in Table 2 below. The percentage of patients exhibiting symptoms in the study are shown in the right panel.

TABLE 2

| Symptoms | Number of patients (n) | % |
|---|---|---|
| Breathlessness, n (%) | 18 | 90 |
| Tiredness, n (%) | 16 | 80 |
| Stomic pain, n (%) | 2 | 10 |
| Constipation, n (%) | 4 | 20 |
| Diarrhea, n (%) | 1 | 5 |

The level of Ferritin increased significantly from baseline to 12 weeks, 47 to 85 µg/L (p=0.001) and from baseline to 6 weeks, 47 to 78 µg/L (p=0.009). Transferrin saturation (TSAT) increased significantly from baseline to 12 weeks, 20 to 25% (p=0.043) and from baseline to 6 weeks, 20 to 27% (p=0.046). Hepcidin also increased significantly from baseline to 12 weeks, 2.5 to 4.2 nmol/L (p=0.026) and from baseline to 6 weeks, 2.5 nmol/L to 4.8 nmol/L (p=0.006).

For other laboratory analysis results, see Table 3 below.

TABLE 3

Results of laboratory analysis

| Test | Baseline, IQR | 6 weeks, IQR | p-value baseline and 6 w | 12 weeks, IQR | p-value baseline and 12 w |
|---|---|---|---|---|---|
| Hemoglobin, g/L | 144 (135-155) | 138 (129-150) | 0.301 | 142 (131-152) | 0.461 |
| Iron, µmol/L | 13.5 (10.2-19.8) | 16.5 (13.2-23.0) | 0.102 | 16.0 (13.0-24.0) | 0.096 |
| Ferritin, µg/L | 47 (32-78) | 78 (57-113) | 0.009 | 85 (62-171) | 0.001 |
| Transferrin, g/L | 2.6 (2.4-2.9) | 2.4 (2.2-2.7) | 0.038 | 2.3 (2.0-2.5) | 0.009 |
| TSAT, % | 20 (15-30) | 27 (21-33) | 0.046 | 25 (21-44) | 0.043 |
| Hepcidin, nmol/L | 2.5 (0.8-4.4) | 4.8 (3.0-7.4) | 0.006 | 4.2 (2.0-8.8) | 0.026 |
| hsCRP, mg/L | 2.0 (0.9-4.2) | 2.0 (1.2-5.5) | 0.565 | 1.9 (0.8-4.1) | 0.841 |

IQR = interquartile range;
TSAT = transferrin saturation

Adverse Effect

There were four patients who stopped study medication before EOS. Three patients because of vomiting or diarrhea and one patient because of hospitalization for some other disease than HF. One of those patients stopped study medication after 3.5 weeks but still increased ferritin level from 198 to 237 µg/L and TSAT from 16 to 21% at EOS.

Dosage

Three patients took only one tablet per day for 2.5, 6 and 7.5 weeks, respectively but still increased their ferritin level from baseline to EOS with 38%, 174% and 95%, respectively. Thirteen patients took study medication according to the protocol for 12 weeks had a median ferritin level at baseline, 42 (32-57.5) µg/L, at 6 weeks 83 (61-110.5) µg/L and at 12 weeks 87 µg/L (77-139) as compared the intention to treat patients who had a median ferritin level of 85 µg/L.

Compliance

The patients (except three patients) who completed the study had a compliance above 80%.

Discussion

The main finding was a highly statistical increase of ferritin levels after 3 months of oral iron succinate treatment. There was also a significant increase of TSAT levels. The null hypothesis is thus rejected. Surprisingly, a significant uptake was evident already after six weeks. The increase of ferritin levels seemed to be of about the same magnitude, irrespective of if the patients suffered from HFpEF or HfrEF. The uptake did not seem to be gender specific because the levels in females and males increased rather equally.

Iron succinate uptake has never been tested in non-anemic patients with HF. A search in PubMed revealed no publications with search terms, iron succinate, iron deficiency and heart failure. A few studies have compared oral iron therapy with intravenous iron treatment [4].

The present study is the first study on iron uptake after oral administration of iron succinate to non-anemic patients diagnosed with both HfpEF or HfrEF and iron deficiency. Interestingly, iron uptake increased significantly already after six weeks, not reported earlier for this non-anemic patient group with HF and ID.

Another pilot study IRON-OUT study [9] compared oral administration of 200 mg ferrous sulphatein 3 times a day and intravenous administration of 200 mg iron sucrose per week for 5 weeks or placebo in 23 patients. The patients were diagnosed with HF and ejection fraction <40% and anaemia (9-12 g/L).

Ferritin levels increased from 167±149 ng/mL to 293±270 ng/mL in the group receiving intravenous injection and from 115±141 ng/mL to 218±189 ng/mL in the group given oral administration of iron, but the increase of TSAT was less in the group getting oral administration of iron vs. intravenous administration of iron.

The main differences between the study summarized above and the present study is that the IRON-OUT study tested patients with HF and anaemia administering high doses of iron sulphate.

Another Phase 2, double-blind, placebo-controlled randomized clinical trial of patients with HFrEF (<40%) and iron deficiency, the IRONOUT-study, compared oral iron polysaccharide 150mg twice daily for 16 weeks or placebo (6). Ferritin increased modestly by 18 ng/ml (CI: −8 to 38) of oral iron polysaccharide and 1 ng/ml (CI: −15 to 17, p=0, 06).) for placebo, TSAT increased 2% (CI: −3 to 7) of oral iron but 0% (CI: −5 to 5) on placebo (p=0.003). The main difference to the present study was that they included only patients with HFrEF and used iron polysaccharide with high dose of iron.

The total amount of iron per day in the present study was 65.96 mg, which is lower than in other studies. Despite that, the uptake was significant already after 6 weeks as measured by ferritin and TSAT. This is surprisingly and has never been shown before in this patient group, i.e., patients with HF. The results are not influenced if the patients have HFrEF or HFpEF.

The reported adverse effects in the present study were rather low but type of adverse effects was as could be expected. The overall compliance was good and may be due to the rather low iron dose used in the present study.

Hepcidin and CRP levels were at baseline in ordinary ranges which was probably one reason for the significant uptake of iron succinate in our study. One patient with elevated hepcidin and CRP levels also showed a similar uptake as those patients with ordinary hepcidin and CRP levels. In the study by Lewis et al., patients in the first (0-<3,3) and second (3,3-6,6 ng/ml) quartiles (QRs) increased significantly their ferritin levels, but not in the $3^{rd}$ and $4^{th}$ QRs. Their increase in ferritin levels in QR 1 and QR 2 was much less compared to the results in our study. It is well known that HF is related to inflammatory state but cause or consequence or both of HF is still under debate [11] and warrants further investigation [2].

Iron deficiency is one of the most prevalent co-morbid conditions in HF. The results presented in present invention now provides a novel oral therapy that counteracts many of the problems with prior art. The therapy is successful, convenient and at low cost, a win-win situation for the patient and the society.

Intravenous injection of Iron is available for patients needing an immediate increase in iron levels, or patient suffering from severe side effects, and non-responders.

Heart failure is a condition that increases inflammatory onset leading to increased hepcidin levels, which makes it difficult for this subject group to uptake iron. The data obtained in the present study revealed a marked and significant improved iron uptake, saturation and deposits. This study strongly indicates that Inofer® can be a valuable medicine for patients with a low-grade inflammation and elevated hepcidin levels which otherwise do not benefit from oral administration of iron.

In view of the present investigation, oral administration of iron succinate (i.e., Inofer®) may increase the uptake of iron in elite athletes, despite the presence of low-grade inflammatory conditions and elevated hepcidin levels evoked by hard work. This means that Inofer® could be a better alternative to other therapeutics such as oral iron salts and IV injections.

Conclusion

Oral iron succinate significantly increased uptake of iron with almost doubling of ferritin levels and increased TSAT in patients with HF. Patients with HFrEF or HFpEF seemed to respond rather equal. The present investigation challenge the opinion that oral iron treatment should not be used in non anaemic patients with iron deficiency and heart failure.

REFERENCES

1. Fitzsimons S, Doughty R N. Iron deficiency in patients with heart failure. European heart journal Cardiovascular pharmacotherapy. 2015;1(1):58-64.
2. Ponikowski P, van Veldhuisen D J, Comin-Colet J, Ertl G, Komajda M, Mareev V, et al. Beneficial effects of long-term intravenous iron therapy with ferric carboxymaltose in patients with symptomatic heart failure and iron deficiencydagger. European heart journal. 2015; 36(11):657-68.
3. Anker S D, Kirwan B A, van Veldhuisen D J, Filippatos G, Comin-Colet J, Ruschitzka F, et al. Effects of ferric carboxymaltose on hospitalisations and mortality rates in iron-deficient heart failure patients: an individual patient data meta-analysis. European journal of heart failure. 2018;20(1):125-33.
4. McDonagh T, Macdougall I C. Iron therapy for the treatment of iron deficiency in chronic heart failure: intravenous or oral? European journal of heart failure. 2015;17(3):248-62.
5. Markousis-Mavrogenis G, Tromp J, Ouwerkerk W, Devalaraja M, Anker SD, Cleland JG, et al. The clinical significance of interleukin-6 in heart failure: results from the BIOSTAT-CHF study. European journal of heart failure. 2019.
6. Lewis G D, Malhotra R, Hernandez A F, McNulty S E, Smith A, Felker G M, et al. Effect of Oral Iron Repletion on Exercise Capacity in Patients With Heart Failure With Reduced Ejection Fraction and Iron Deficiency: The IRONOUT HF Randomized Clinical Trial. Jama. 2017;317(19):1958-66.
7. Brise H, Hallberg L. Absorbability of different iron compounds. Acta medica Scandinavica Supplementum. 1962;376:23-37.
8. Grimolizzi F, Arranz L. Multiple faces of succinate beyond metabolism in blood. Haematologica. 2018;103 (10):1586-92.
9. Beck-da-Silva L, Piardi D, Soder S, Rohde LE, Pereira-Barretto AC, de Albuquerque D, et al. IRON-HF study: a randomized trial to assess the effects of iron in heart failure patients with anaemia. International journal of cardiology. 2013; 168(4):3439-42.
10. Gaillard C A, Bock A H, Carrera F, Eckardt K U, Van Wyck D B, Bansal S S, et al. Hepcidin Response to Iron Therapy in Patients with Non-Dialysis Dependent CKD: An Analysis of the FIND-CKD Trial. PloS one. 2016;11(6):e0157063.
11. Van Linthout S, Tschope C. Inflammation-Cause or Consequence of Heart Failure or Both? Current heart failure reports. 2017;14(4):251-65.
12. Brise H, Hallberg L. Effect of succinic acid on iron absorption. Acta medica Scandinavica Supplementum. 1962;376:59-73.
13. Tretter L, Patocs A, Chinopoulos C. Succinate, an intermediate in metabolism, signal transduction, ROS, hypoxia, and tumorigenesis. Biochimica et to biophysica acta. 2016;1857(8):1086-101.
14. Klip I T, Comin-Colet J, Voors A A, Ponikowski P, Enjuanes C, Banasiak W, et al. Iron deficiency in chronic heart failure: an international pooled analysis. American heart journal. 2013;165(4):575-82 e3.

The invention claimed is:

1. A method for the treatment of iron deficiency in a subject diagnosed with heart failure (HF) with reduced ejection fraction (HFrEF), said method comprising orally administering a pharmaceutically effective dose of a pharmaceutical composition comprising iron succinate at least once a day for 3 weeks, wherein the amount of iron succinate is 100 mg per dose.

2. The method according to claim 1, wherein the iron succinate is not taken in conjunction with food.

3. The method according to claim 1, wherein the treatment is performed at least once a day for 6 weeks.

4. The method according to claim 1, wherein the treatment is performed at least once a day for 2 months.

5. The method according to claim 1, wherein the treatment is performed at least once a day for 3 months.

6. The method according to claim 1, wherein the treatment is performed at least once a day for or 6 months.

7. The method according to claim 1, wherein the treatment is performed twice a day for at least 3 weeks.

8. The method according to claim 1, wherein the treatment is performed twice a day for at least 6 weeks.

9. The method according to claim 1, wherein the treatment is performed twice a day for at least 2 months.

10. The method according to claim 1, wherein the treatment is performed twice a day for at least 3 months.

11. The method according to claim 1, wherein the treatment is performed twice a day for at least or 6 months.

12. The method according to claim 2, wherein the treatment is performed twice a day for at least 3 months.

\* \* \* \* \*